(12) United States Patent
Lopata

(10) Patent No.: US 7,084,608 B2
(45) Date of Patent: Aug. 1, 2006

(54) PCMCIA CARD WITH DEDICATED ON-BOARD BATTERY

(75) Inventor: Douglas D. Lopata, Boyertown, PA (US)

(73) Assignee: Agere Systems Inc., Allentown, PA (US)

( * ) Notice: Subject to any disclaimer, the term of this patent is extended or adjusted under 35 U.S.C. 154(b) by 347 days.

(21) Appl. No.: 10/624,392

(22) Filed: Jul. 22, 2003

(65) Prior Publication Data

US 2005/0017689 A1    Jan. 27, 2005

(51) Int. Cl.
*H02J 7/00* (2006.01)
(52) U.S. Cl. .................. 320/136; 320/120; 365/226
(58) Field of Classification Search ........... 320/136, 320/128; 365/226
See application file for complete search history.

(56) References Cited

U.S. PATENT DOCUMENTS

| | | | |
|---|---|---|---|
| 5,564,055 A | 10/1996 | Asnaashari et al. | 395/800 |
| 5,619,396 A | 4/1997 | Gee et al. | 361/686 |
| 5,706,239 A * | 1/1998 | Brys | 365/226 |
| 5,870,615 A | 2/1999 | Bar-On et al. | 395/750.02 |
| 5,971,282 A * | 10/1999 | Rollender et al. | 235/492 |
| 5,989,751 A | 11/1999 | Cotte et al. | 429/331 |
| 6,030,728 A | 2/2000 | Cotte et al. | 429/329 |
| 6,199,168 B1 * | 3/2001 | Miller | 713/300 |
| 6,421,430 B1 | 7/2002 | Hollenbach et al. | 379/93.36 |
| 6,838,932 B1 * | 1/2005 | Izumiyama et al. | 330/51 |

\* cited by examiner

*Primary Examiner*—Karl Easthom
*Assistant Examiner*—Samuel Berhanu

(57) ABSTRACT

A PCMCIA card is provided that includes an on-board (integrated) storage battery and, preferably, charging circuitry for same. The on-board storage battery is dedicated to operation of on-board devices that have higher current/power requirements than are available from the 5 volt pins of the PCMCIA card. For example, in a cellular device application, during high-load transmit periods, the battery is used to source the power amplifier, and during low-load periods, the battery can be charged by the on-board battery charging circuitry, preparing the battery for the next high current/power transmit burst. In a preferred embodiment, the battery comprises a very thin Li-Ion/polymer battery or equivalent.

21 Claims, 2 Drawing Sheets

PCMCIA CARD WITH DEDICATED ON-BOARD BATTERY

FIELD OF THE INVENTION

This invention relates to integrated circuit (IC) cards compatible with Personal Computer Memory Card International Association (PCMCIA) standards and devices that include slots for receiving PCMCIA cards, and, more particularly, to a method and apparatus for providing an "on demand" power source on the PCMCIA card that is selectively available for use during high power operations.

BACKGROUND OF THE INVENTION

Portable computers and other electronic devices continue to be reduced in size as advances in technology reduce the size of components used to manufacture these devices. Along with this size reduction, compact slots have been provided in the devices for receiving IC cards. In an effort to standardize IC card formats, the PCMCIA has promulgated various standards governing the physical dimensions and interface configurations of IC cards.

In brief, the PCMCIA standards set forth, among other things, IC card physical dimensions, electrical interface requirements between IC cards and the devices utilizing the IC cards, and a data format for the interchange of information between IC cards and devices utilizing IC cards. In addition to having 3 volt (130–150 mA) pins, PCMCIA slots (both standard size and "mini-PCMCIA" slots) also have two 5-volt pins, each of which source 500 mA, thereby limiting the sourcing capability of the 5-volt pins to a total of 1 A at 5 volts.

Computer manufacturers have endorsed the PCMCIA standards and have included at least one slot for a PCMCIA card in virtually all laptop, sub-notebook and notebook computers. In response to the increasing popularity of the PCMCIA standards, numerous PCMCIA-compatible devices, such as hard drives, modems, local area network adaptors and wireless communication systems have been developed. For example, one wireless communication card which serves the function of a wireless modem connectable to a cellular network is manufactured by Nokia under the product name D211. Sierra Wireless and others produce similar devices, referred to herein generically as "cellular IC cards".

Cellular functionality can also be integrated into combination cards that combine wireless LAN (WiFi) and cellular capability. Given these integration capabilities, the computer user can plug a card into his/her PC or laptop that provides wireless/cellular capability. However, unlike many applications that use PCMCIA or similar slots, cellular hardware can have very high peak current and/or power requirements that can exceed the source capability of the PCMCIA slot for short periods of time. These peak current/power periods occur during transmit bursts, when the cellular power amplifier (PA) must transmit at power levels of over 2–3 W, worst case, and can/will draw more than the total of 1 A at 5 V available from the slot. This can be particularly problematic with new high data-rate standards, such as EDGE, which cause the PA to draw more current due to their low efficiency.

In an attempt to provide an on-demand temporary power source for use during these high-consumption periods, prior art systems have utilized a bank of large and expensive capacitors, requiring many capacitors in parallel, or one large super capacitor cell. However, the use of the capacitors is not without its drawbacks. For example, capacitors can be relatively expensive, have high leakage currents, and consume a significant amount of space on the PC board of the card, both on the board surface and in terms of height.

SUMMARY OF THE INVENTION

A PCMCIA card according to the principles of the present invention comprises an on-board (integrated) storage battery and charging circuitry for same. The on-board storage battery is dedicated to operation of on-board devices that have higher current/power requirements than are available from the 3 and 5 volt pins of the PCMCIA card. For example, in a cellular device application, during high-load transmit periods, the battery is used to source the power amplifier, and during low-load periods, the battery can be charged by the on-board battery charging circuitry, preparing the battery for the next high current/power transmit burst. In a preferred embodiment, the battery comprises a very thin Li-Ion/polymer battery or equivalent.

DETAILED DESCRIPTION OF THE PREFERRED EMBODIMENTS

Figure 1A:
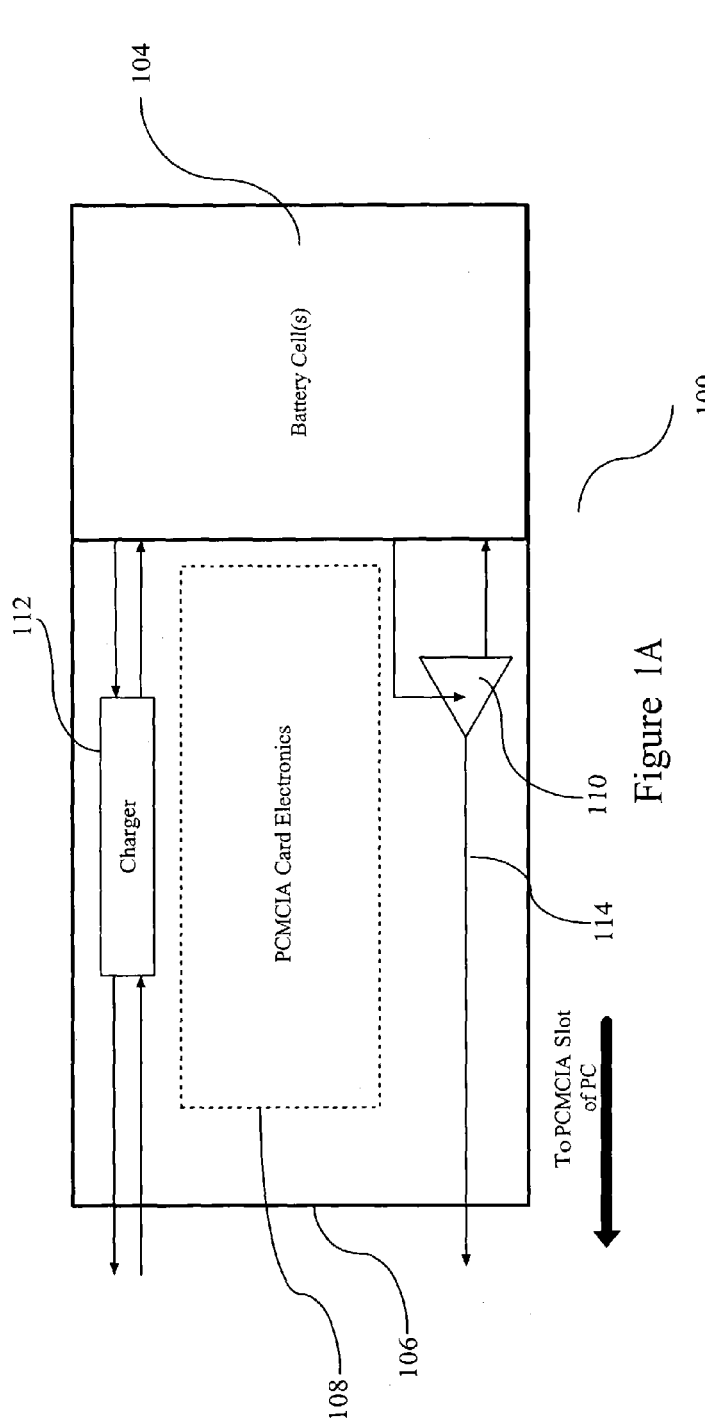
FIGS. 1A and 1B illustrate a top and side view, respectively, of a PCMCIA card configured in accordance with the present invention.
Figure 1B:
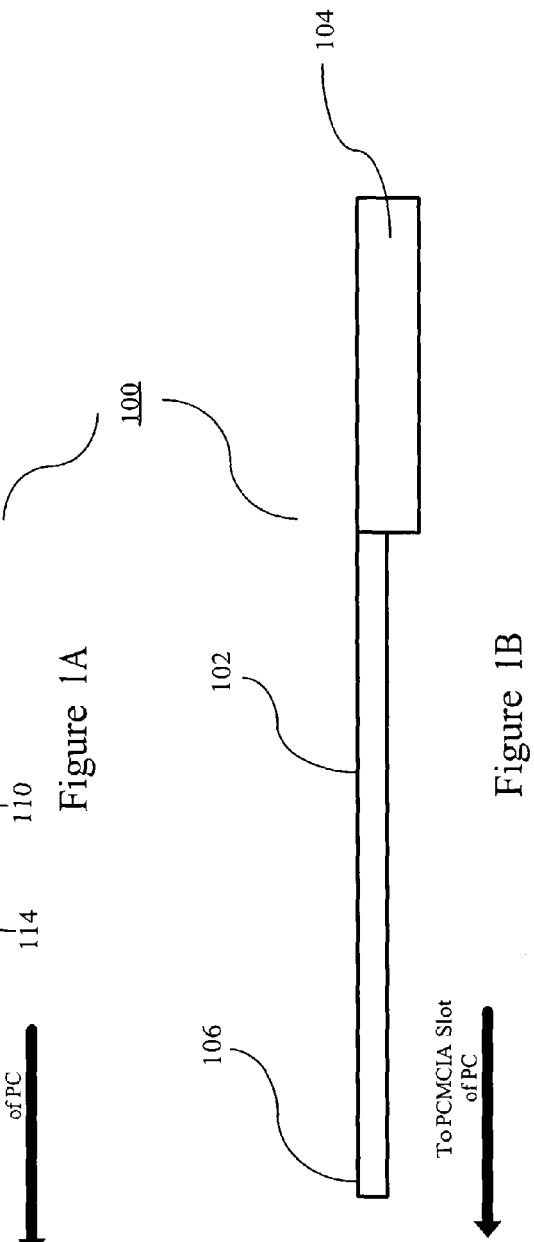

FIGS. 1A and 1B illustrate a top and side view, respectively, of a PCMCIA card 100 configured in accordance with the present invention. FIG. 1A illustrates, in block diagram format, the novel elements of the present invention, i.e., the illustration of FIG. 1A shows the functional elements of the present invention rather than an accurate depiction of the physical structure of PCMCIA card 100. The actual physical structure can be selected as desired within the limitations set forth in the PCMCIA standards.

Referring to FIG. 1A, PCMCIA card 100 comprises a components section 102, the battery cell section 104, and an electrical connection section 106. Battery cell section 104 houses and one or more battery cells, for example, Lithium polymer battery cells. It is understood that the present invention is not limited to the use of Lithium polymer battery cells, and any battery cells that can be housed in a PCMCIA card and which can function to operate a transmitter amplifier (or other circuitry utilizing the on-board battery) as disclosed herein are considered to be included in the present disclosure and part of the present invention. Lithium polymer batteries are preferred in view of their ability to be constructed in a high-density and thin configuration.

The electronic components section 102 includes a PCMCIA electronics block 108, which represents the standard electronics associated with a prior art PCMCIA card. In the configuration discussed herein whereby the PCMCIA card is configured to provide wireless cellular capability, PCMCIA electronics block would include a cellular transmitter/receiver and associated electronics necessary to connect to the control hardware and software of the PC. If the PCMCIA card is a multi-function card (e.g., if it includes WiFi and cellular capability), then the electronics needed to perform this dual function will be included in electronic component block 108.

Transmitter amplifier 110 (in this example) is coupled to battery cell section 104 so that transmitter amplifier 110 is provided with power from battery cell section 104 during operation. Control circuitry (not shown) is coupled to transmitter amplifier 110 from the PCMCIA electronics block 108 to control the operation of transmitter amplifier 110 appropriately. An antenna 114 is shown coupled to transmitter amplifier 110 so that, as is well known, the power generated by transmitter amplifier 110 can be applied to a transmission antenna so that the transmitter can perform its transmission function. Although not shown, antenna 114 can be integrated as part of the PCMCIA card 100 in a well-known manner.

PCMCIA card 100 is also configured to contain battery charging circuitry 112, coupled between battery cell section 104 and the PC in which the PCMCIA card is inserted. The power required to operate the battery charging circuitry 112 is supplied by the PC in a well-known manner. If desired, the battery charging circuitry can be included in an integrated power management function for the card electronics. Many examples of products that include integrated charging functionality exist, including the Agere PCS 20XX and PSC 21XX families, and the Linear Technologies LTC 1734, LTC 1733, or LTC 4054.

Figure 2:
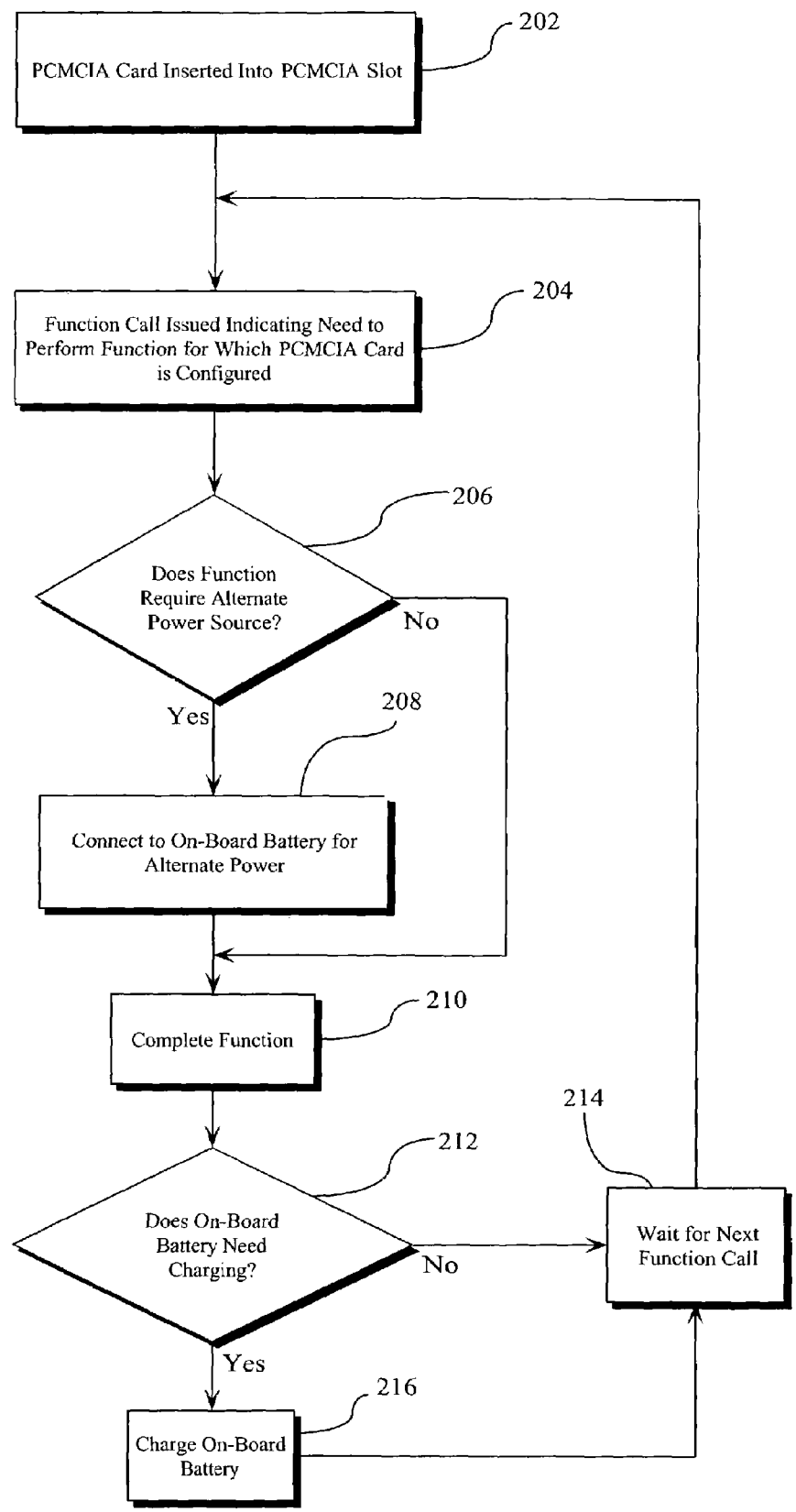
FIG. 2 is a flowchart illustrating an example of steps performed in the operation of the present invention.

FIG. 2 is a flowchart illustrating an example of steps performed in the operation of the present invention in connection with a PCMCIA card that provides cellular functionality. At step 202, the PCMCIA card is inserted into the PCMCIA slot of the PC in a known manner. The PC user operates the PC for the desired functions, and at some point decides to utilize the cellular capability of the PCMCIA card. At step 204, a function call is issued indicating the need to perform a transmission function related to the cellular capability. If desired, the cellular PA or other electronic element having high peak current/power needs can be in an "always connected" configuration with respect to the battery cells so that whenever the battery power is needed, it is already available without any further action. In such a case, the process would jump directly to step 210.

For instances where it is desired to have more control over the access to the battery cells by the electronics, the battery can be switchably connectable to the electronic elements. If this is the case, steps 206 and 208 are followed. At step 206, a determination is made as to whether or not the function requested requires the use of the alternate power source (in this example, the battery cells 104). If at step 206, it is determined that the alternate power source is required, the process proceeds to step 208, where a connection is made (e.g., via any known switching devices) to the onboard battery to supply the alternate power source. In this mode, whenever the transmitter transmits, it draws the power needed for the transmission from battery cells 104. If at step 206 it is determined that the function does not require the alternate power source, the process skips step 208 and proceeds directly to step 210.

At step 210, the function requested is completed. At step 212, a determination is made as to whether or not the onboard battery needs charging. If during the completion of the function, there was no need to connect to the onboard battery source, the system can be configured to automatically skip step 212 and move directly to step 214. If at step 212 it is determined that the onboard battery needs charging, at step 216 the charging process is commenced to charge the battery. Alternatively, the charging process can b continuous, with charging terminated only when battery top-off has been completed. The process then proceeds to step 214 to wait for the next function call. The entire process (all steps) is repeated until the PCMCIA card is removed or is no longer being used by the PC.

The need for charging of the battery is typically determined by monitoring the battery voltage or by "fuel gauging" the battery to determine how much charge the battery contains. In some situations, self-leakage may occur even though the battery has not been used at all. Thus, it is understood that the monitoring of the battery for its level of charge may occur independently of whether or not the battery has been in use.

In the above example, the system is described in which the PCMCIA card is used to access cellular service. It is understood, however, that the present invention is not so limited, and that the present invention applies to any system in which there is a need for a short-term current/power source to be supplied to components residing on the PCMCIA card. It is understood that while the above example illustrates a situation where the present invention is used to provide current/power that exceeds the current/power available from the primary device, the present invention can also be applied to provide current/power to components in the PCMCIA card when the primary device is operating off of its own battery power, so that the drain on the battery of the primary device is reduced.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A PCMCIA card including a secondary device that provides functionality to a primary device when said PCMCIA device is coupled to said primary device, said primary device providing power to said PCMCIA card at a maximum current and power level, and said secondary device having operating characteristics that, at least at certain times, exceed said maximum current level, said PCMCIA card comprising:

a storage battery capable of delivering power at a current and/or power level that exceeds the maximum current and/or power level provided by said primary device, whereby said PCMCIA card is configured to couple said secondary device to said storage battery on demand to provide said secondary device with power at a current and/or power level that exceeds the maximum current and/or power level provided by said primary device.

2. A PCMCIA card according to claim 1, further comprising:

a battery charging circuit, coupleable between said primary device and said storage battery; whereby said battery charging circuit is configured to recharge said storage battery.

3. A PCMCIA card according to claim 2, wherein said secondary device comprises a device that provides wireless functionality to said primary device.

4. A PCMCIA device according to claim 3, wherein said secondary device further comprises a device that provides cellular functionality to said primary device.

5. A PCMCIA card according to claim 1, wherein said secondary device includes a power amplifier that has power requirements that exceed said maximum current and/or power level.

6. A PCMCIA card according to claim 5, wherein said primary device comprises a portable computer.

7. A PCMCIA card according to claim 5, wherein said primary device comprises a PDA.

8. A PCMCIA card as set forth in claim 5, wherein said primary device comprises a desktop computer.

9. A PCMCIA card according to claim 1, wherein said storage battery comprises one or more Lithium Ion batteries.

10. In a PCMCIA card including a secondary device that provides functionality to a primary device when said PCMCIA device is coupled to said primary device, said primary device providing power to said PCMCIA card at a maximum current and power level, and said secondary device having operating characteristics that, at least at certain times, exceed said maximum current level, a method of providing power to said secondary device that exceeds said maximum current level comprising the steps of:
 providing said PCMCIA card with a storage battery capable of delivering power at a current and/or power level that exceeds the maximum current and/or power level provided by said primary device; and
 coupling said secondary device to said storage battery on demand to provide said secondary device with power at a current and/or power level that exceeds the maximum current and/or power level provided by said primary device.

11. The method of claim 10, further comprising the steps of:
 providing said PCMCIA device with a battery charging circuit, coupleable between said primary device and said storage battery; and
 recharging said storage battery using said battery charging circuit at predetermined times.

12. The method of claim 10, wherein said storage battery is built into said PCMCIA card.

13. A system for providing functionality to a primary device when a PCMCIA device is coupled to said primary device, said primary device providing power to said PCMCIA card at a maximum current and power level, and said secondary device having operating characteristics that, at least at certain times, exceeds said maximum current level, said system comprising:
 a PCMCIA card;
 a storage battery built in to said PCMCIA card, said storage battery capable of delivering power at a current and/or power level that exceeds the maximum current and/or power level provided by said primary device; and
 coupling means for coupling said secondary device to said storage battery on demand, to provide said secondary device power at a current and/or power level that exceeds the maximum current and/or power level provided by said primary device.

14. The system of claim 13, further comprising:
 a battery charging circuit, coupleable between said primary device and said storage battery; whereby said battery charging circuit is configured to recharge said storage battery.

15. The system according to claim 14, wherein said secondary device comprises a device that provides wireless functionality to said primary device.

16. The system according to claim 15, wherein said secondary device further comprises a device that provides cellular functionality to said primary device.

17. The system according to claim 13, wherein said secondary device includes a power amplifier that has power requirements that exceed said maximum current and/or power level.

18. The system according to claim 17, wherein said primary device comprises a portable computer.

19. The system according to claim 17, wherein said primary device comprises a PDA.

20. The system as set forth in claim 17, wherein said primary device comprises a desktop computer.

21. The system according to claim 13, wherein said storage battery comprises one or more Lithium Ion batteries.

\* \* \* \* \*